United States Patent [19]
Meyer et al.

[11] Patent Number: 5,754,371
[45] Date of Patent: May 19, 1998

[54] SWAGE PLATE BUMPER FOR DISC DRIVE

[75] Inventors: Dallas W. Meyer, Burnsville; Joseph C. Liu, Bloomington; Zine-Eddine Boutaghou, Owatonna, all of Minn.

[73] Assignee: Seagate Technology, Inc., Scotts Valley, Calif.

[21] Appl. No.: 677,134

[22] Filed: Jul. 9, 1996

[51] Int. Cl.⁶ ............................................. G11B 21/22
[52] U.S. Cl. .................................... 360/105; 360/104
[58] Field of Search ............................. 360/104, 105, 360/106, 97.01, 97.02

[56] References Cited

U.S. PATENT DOCUMENTS

| | | | |
|---|---|---|---|
| 5,422,770 | 6/1995 | Alt | 360/105 |
| 5,453,889 | 9/1995 | Alt | 360/97.01 |
| 5,471,735 | 12/1995 | Hanke et al. | 29/603 |

Primary Examiner—Stuart S. Levy
Assistant Examiner—William R. Korzuch
Attorney, Agent, or Firm—Kinney & Lange, P.A.

[57] ABSTRACT

An swage plate bumper overlies the swage plate of a suspension arm and the end of an actuator arm in a computer disc drive. The swage plate bumper may be molded in two pieces which snap together onto the actuator arm through the swaged hole. Alternatively, the swage plate bumper may be provided with an adhesive attachment to the swage plate, or the swage plate may be coated with a compressible coating during manufacture. The swage plate bumper extends over four corners of the swage plate and prevents damage to the disc surface which might otherwise be caused when the corners of the swage plate contact the disc during a drop or other sudden acceleration.

12 Claims, 9 Drawing Sheets

SWAGE PLATE BUMPER FOR DISC DRIVE

This application claims the benefit of provisional application no. 60/009,788 filed on Jan. 10, 1996, entitled "Arm Bumper: A Method To Prevent Media Damage During Shock".

BACKGROUND OF THE INVENTION

The present invention relates to an actuator arm used to carry a magnetic head in a magnetic disc drive unit. In particular, the invention relates to a apparatus and method for preventing damage due to contact between a swage plate or actuator arm and a magnetic disc which might otherwise occur when the disc drive is dropped or subject to a violent shock.

Magnetic discs are commonly used to store information in computer devices. Each side of the disc has its own associated magnetic head assembly used for reading and writing information thereon. Each magnetic head assembly is mounted on the end of a support or actuator arm, which positions the head directly adjacent the disc surface. By moving the actuator arm, the magnetic head assembly is moved between tracks on the disc surface. Many actuator arms are rotary, wherein the magnetic head assembly is moved between tracks by activating a servomotor which pivots the actuator arm. A linear actuator may alternatively be used to move a magnetic head assembly inward or outward on the disc along a straight line.

To reduce size and increase storage capacity in magnetic disc drive units, magnetic discs have been stacked in a "pack" all carried within the same disc drive unit. All of the discs are connected together and rotate about the same axis. To further increase space savings in the disc drive unit, all of the actuator arms are connected together and pivot about the same pivot point. A single servomotor typically controls all of the actuator arms and their associated magnetic heads. This configuration is identified as an "E-block", which refers to the "E" type of shape formed by the adjacent arms and the servomotor/pivot assembly.

Each magnetic head assembly is typically connected to its respective actuator arm by a flexure or "suspension" arm. The suspension arm functions as a bending spring to bias the magnetic head assembly toward the disc surface. The magnetic head assembly includes a portion known as a "slider". As the disc pack rotates at high speed (in excess of 10 m/s relative to the slider), the aerodynamic properties of the slider cause the magnetic head assembly to "fly" above its respective disc surface. The flying height of a magnetic head assembly is a function of the speed of rotation of the disc, the aerodynamic properties of the slider and the disc, and the spring tension in its suspension arm.

Each suspension arm is typically connected to its actuator arm using a mounting method known as "ball staking" or "swaging." In swaging two pieces together, a hole in one piece is aligned with a hollow tube which extends from the other piece. A rounded shape (the "ball") is forced through the hollow tube, causing the tube metal to expand and lock the two pieces together.

To further increase space savings in the disc drive unit, the thickness of discs and the axial spacing between discs has been compressed. As of the time of this application, discs for a typical 3½ inch drive have a thickness of about 0.030 inches, with a spacing of about 0.080 inches between discs. Actuator arms are typically about 0.020 inches thick, leaving a spacing of about 0.030 inches between adjacent surfaces of the actuator arm and the disc.

2

As disc drive units have been made increasingly smaller, they have also become increasingly more sensitive to physical shock which may occur when the disc drive units are dropped or otherwise mishandled. If a disc drive unit is dropped or otherwise subject to a sudden acceleration or jerk, the damage to the disc drive may lead either to a partial or total loss of the operability of the disc drive. Significant packaging precautions are taken to transport disc drive units in a way that the sensitive components will not be excessively jarred. If a disc drive unit is dropped or mishandled after it has been used, the damage may be even more catastrophic, because some or all of the data stored on the disc drive may be irretrievable after the damage. Accordingly, it is desired to produce more robust disc drive units which will withstand higher shock forces and hence have a better likelihood of surviving a drop or other sudden impact.

SUMMARY OF THE INVENTION

The present invention is a compressible bumper to overlie the swage plate of a suspension arm and the end of an actuator arm. In the preferred embodiment, the bumper is attached on opposing sides of the actuator arm through the swage hole. The swage plate bumper extends over four corners of the swage plate and prevents damage to the disc surface which might otherwise be caused when the corners of the swage plate contact the disc during a drop or other sudden acceleration. As an alternative to the swage plate bumper being a separate component, the swage plate of the suspension arm may be coated with a compressible polymeric material.

DETAILED DESCRIPTION OF THE PREFERRED EMBODIMENTS

FIGS. 1–4 represent a prior art disc drive structure 10. Disc drive assembly 10 includes disc pack 12 and E-block assembly 14, both of which are mounted on a base 15. Disc pack 12 comprises discs 16 stacked on drive spindle 18. Disc pack 12 shows four discs 16, but fewer or more discs could be used for any particular application as desired. During use of the disc drive 10, drive spindle 18 rotates disc pack 12 at a relatively high speed. E-block assembly 14 comprises servo spindle 20 and a plurality of actuator arms 22. Each actuator arm 22 carries one or two flexure arms or suspension arms 24. Each suspension arm 24 supports a magnetic head assembly 26 adjacent a surface of a disc 16. Each suspension arm 24 includes a load beam 28 and a swage plate 30. Bending of load beams 28 provides the force for biasing each magnetic head assembly 26 against its respective disc 16. Each swage plate 30 is mounted to its corresponding actuator arm 22 by a ball stake mount or swaged hole 32.

Figure 1:
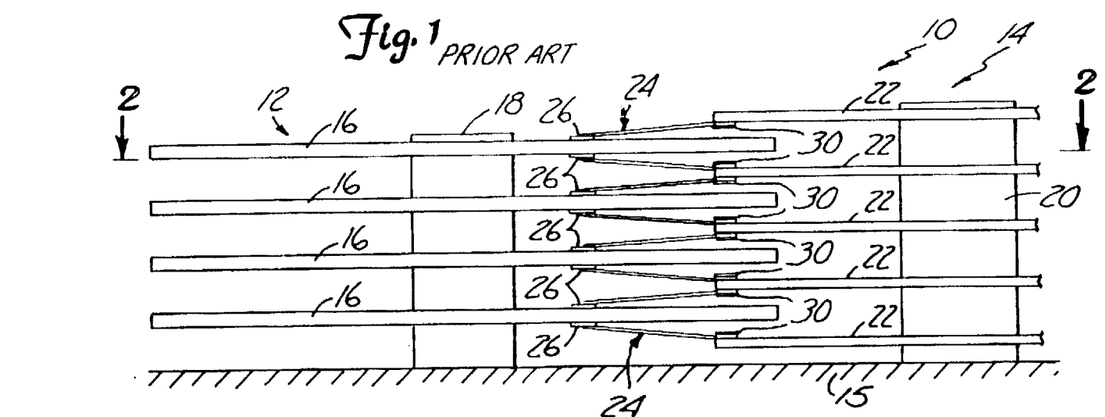
FIG. 1 is a side view of a prior art disc drive.

Each suspension arm 24 is spring loaded, whereby its magnetic head assembly 26 is held in close proximity to the respective disc surface. As disc 16 rotates at high speed about drive spindle 18, the aerodynamic properties of the slider cause magnetic head assembly 26 to "fly" above the surface of disc 16. The flying height of magnetic head assembly 26 above disc 16 is a function of the speed of rotation of disc 16, the aerodynamic lift of the slider of magnetic head assembly 26 and the spring tension in suspension arm 24.

Figure 2:
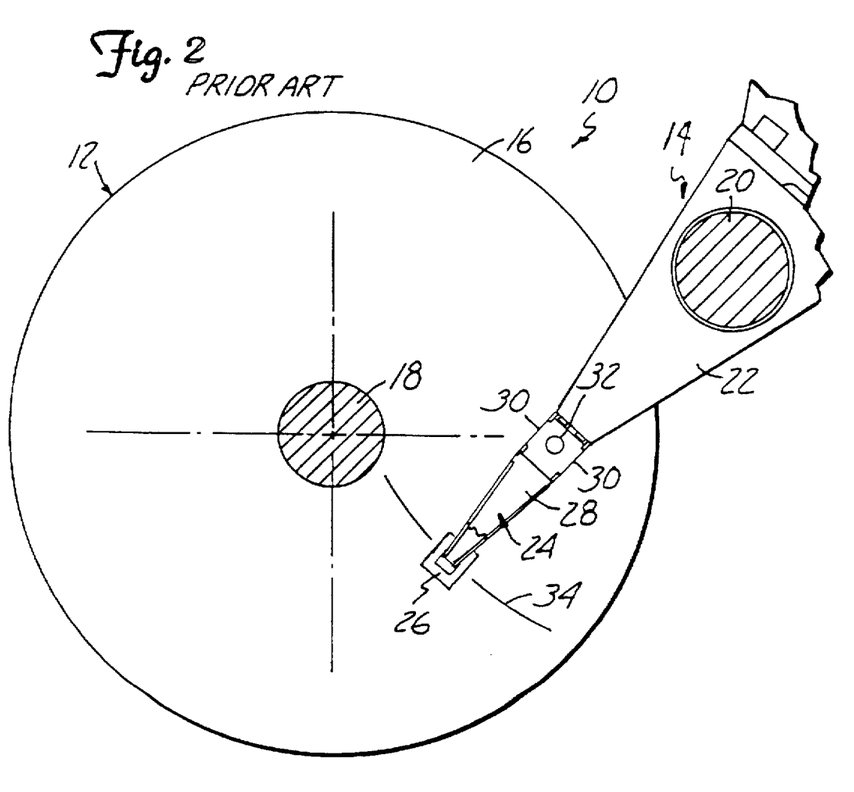
FIG. 2 is a plan view of the prior art disc drive of FIG. 1, taken along line 2—2.

FIG. 2 shows a top view of disc drive 10 of FIG. 1. As E-block assembly 14 pivots about servo spindle 20, magnetic head assembly 26 mounted at the tip of suspension arm 24 swings through arc 34. As disc 16 rotates beneath magnetic head 26, this pivoting motion allows magnetic head assembly 26 to change track positions on disc 16. Because all magnetic head assemblies 26 are attached to a single E-block assembly 14, all magnetic head assemblies 26 move in unison.

When the disc drive assembly 10 is dropped or otherwise undergoes a violent shock, the structures undergo a sudden acceleration which may be several hundred g's. The violent shock may cause several different types of failure modes of the disc drive 10. Some structures may not be able to withstand the high acceleration and may break or permanently bend due to the acceleration, destroying the disc drive 10. Even if all the structures in disc drive 10 are strong enough to withstand the acceleration by themselves, the disc drive 10 may nonetheless be damaged due to contact between components. Shock damage may occur due to impact between the transducer 26 and the disc 16. Various steps may be taken to minimize or avoid such damage, and the present invention is not concerned with impact between the transducer 26 and the disc 16. Even if shock damage due to impact between the transducer 26 and the disc 16 is avoided, shock damage may occur due to impact between the disc 16 and the actuator arm 22 or swage plate 30 of the suspension arm 24. The present invention is concerned with preventing structural damage which may occur due to impact between the actuator arm/swage plate structure and the disc surface.

Depending on the direction of the violent acceleration, portions of the normally rigid structures of the disc drive 10 will bend under the initial acceleration load. For instance, both the discs 16 and the actuator arms 22 may react to an impact as bendable load beams 28. Discs 16 may bend downward from the supported end adjacent drive spindle 18 to the unsupported outer periphery. Similarly, actuator arms 22 may bend downward from the supported end adjacent servo spindle 20 and the unsupported end, and suspension arms 24 may bend downward between the swage plate 30 and the magnetic head 26. During the initial acceleration of the violent shock, the discs 16, actuator arms 22 and suspension arms 24 will all bend in the same direction. However, the amount of deflection of each structure is dependent on the size, shape and materials of that structure. Structural damage to the disc 16 may occur when the actuator arm 22 bends further than the disc 16 such that an overhead swage plate 30 impacts the upper surface of the disc 16, or when the disc 16 bends further than the actuator arm 22 such that the lower surface of the disc 16 hits the underlying swage plate 30. Damage to the disc structure may occur differently depending upon the position of the actuator arms 22 relative to the disc pack 12.

After a first bending in one direction, each rigid structure will attempt to recover to a neutral position by springing back in an opposite direction. The "spring back" motion will cause the rigid structure to overshoot its neutral position in a repeated manner, such that each of the rigid structures vibrates after the initial shock. The time it takes for each structure to "spring back" is dependent on the size, shape and materials of each structure. Accordingly, each structure vibrates after the initial acceleration with its own characteristic frequency.

Figure 3:
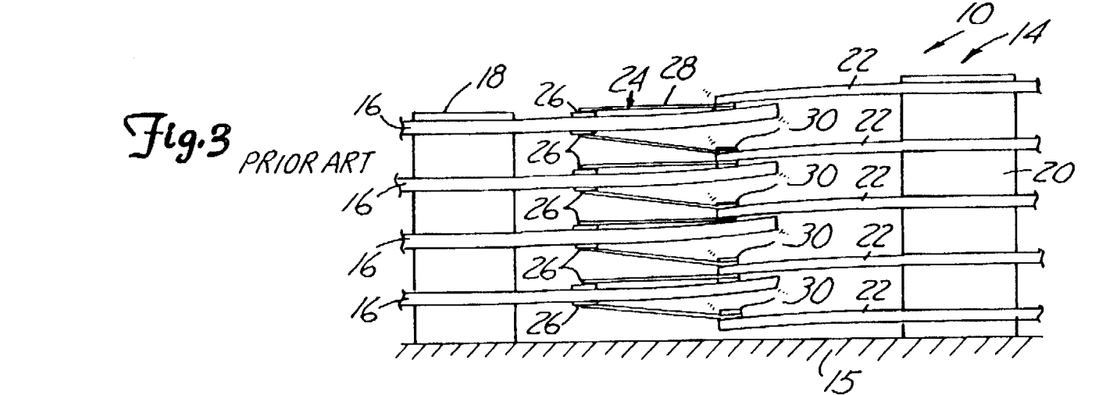
FIG. 3 is a side view of a portion of a disc pack of FIG. 1 during shock, such as when the disc drive unit is dropped.

Accordingly, while the first vibration may tend to leave the actuator arms 22 centrally spaced between the discs 16, the subsequent differences in characteristic frequencies between the actuator arms 22 and the discs 16 may cause damaging contact. Because of the differences in frequency, vibrating structures may impact each other when each is bent in the opposite direction or when each is traveling in the opposite direction. FIG. 3 shows the disc drive 10 during such contact. The difference in natural vibration frequency has placed actuator arms 22 at their lowermost position at the same time that the discs 16 are at their uppermost position. The transducer assembly 26 is in contact with the disc 16 and bends the suspension arm 24 backwards, and swage plate 30 impacts the disc 16. Due to the repeating vibration of both the disc pack 12 and the actuator arms 22, it is believed that a single drop may cause swage plate 30 to make multiple contacts with the surface of disc 16.

Figure 4:
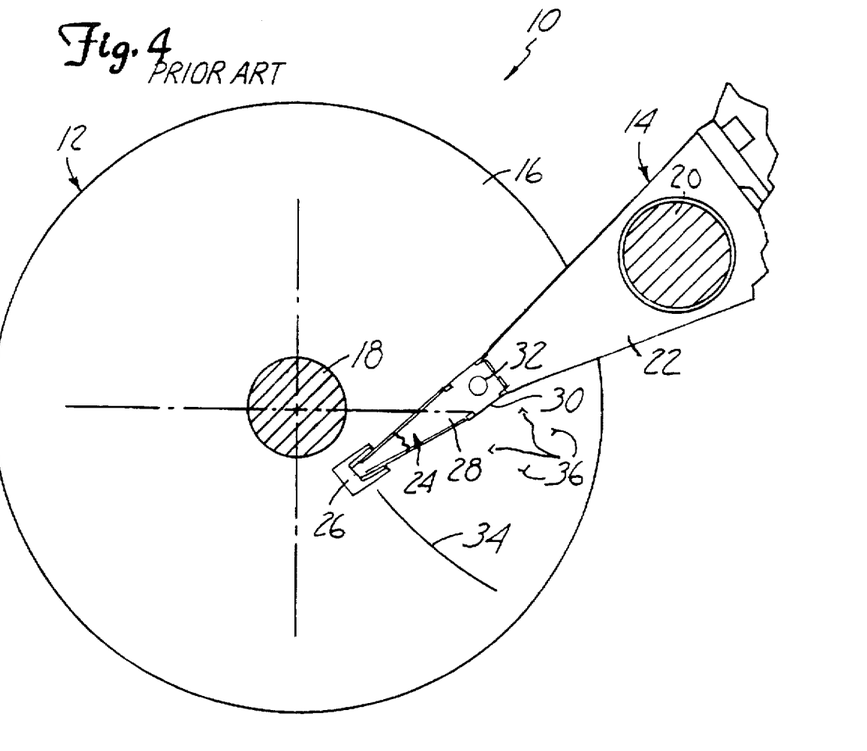
FIG. 4 is a plan view of a disc drive structure of FIG. 3, showing damage.

FIG. 4 shows a disc pack 12 after damage has occurred due to shock and the E-block assembly 14 has been pivoted to reveal the damage. The corners of swage plate 30 have impacted and damaged the surface of disc 16, leaving indentations 36. All of indentations 36 may have been caused by a single impact, or they may have been caused due to several consecutive impacts between swage plate 30 and the surface of disc 16. The pattern of indentations 36 may be uniform or non-uniform, depending upon the specific drop including the direction of the violent acceleration and the position of actuator arm 22 with respect to disc pack 12. The indentations 36 render the portions of the disc 16 in and adjacent the indentations 36 unreadable, and further affect the flight of magnetic head assembly 26. Damage of this type generally renders the entire disc pack 12 unusable.

Figure 5:
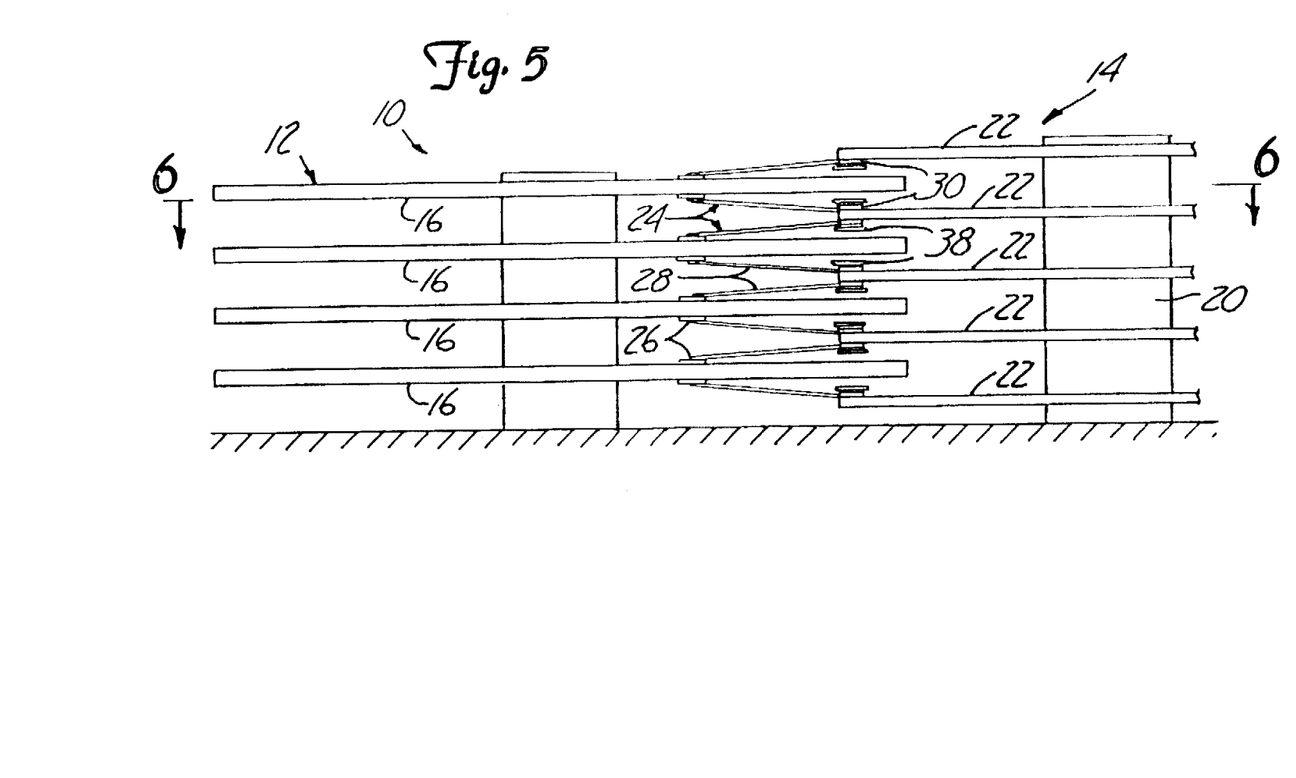
FIG. 5 is a side view of a disc drive unit showing the swage plate bumper of the present invention.
Figure 6:
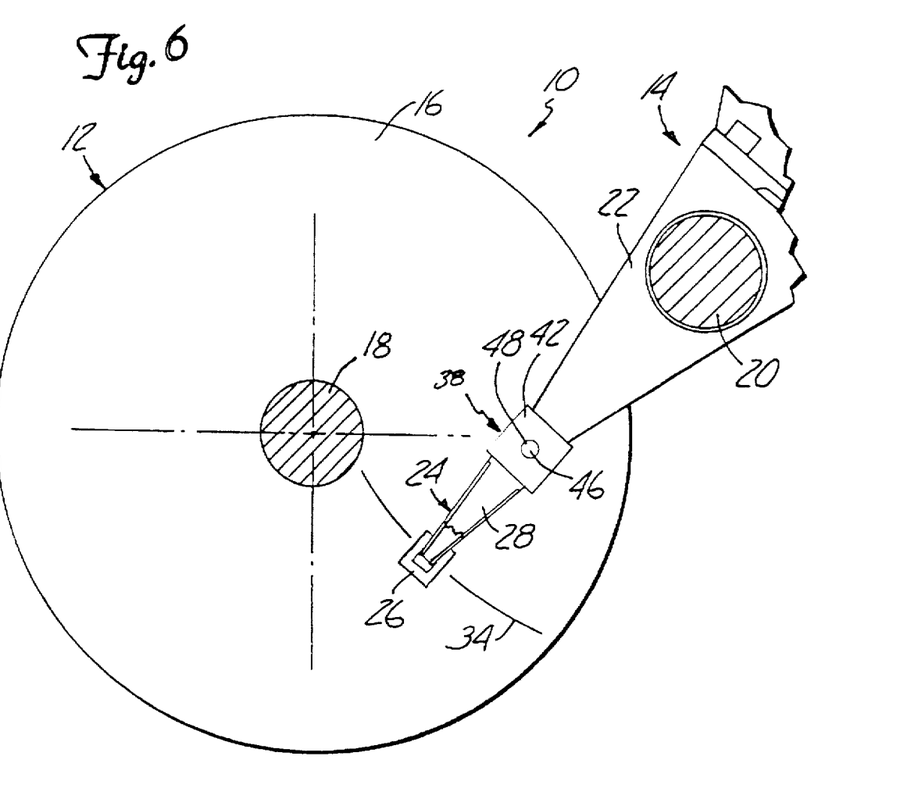
FIG. 6 is a plan view of the disc drive unit of FIG. 5 taken along line 6—6.
Figure 7:
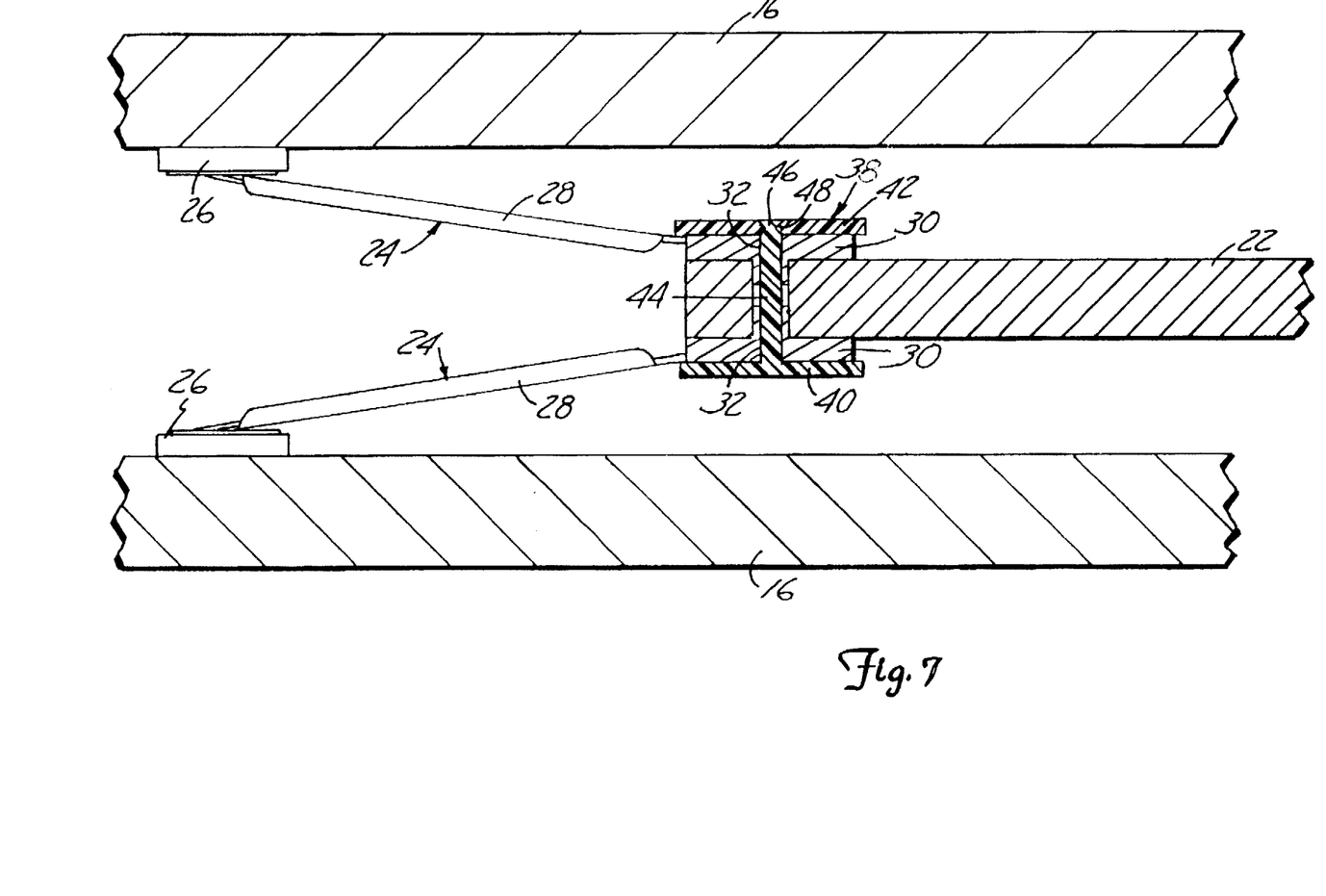
FIG. 7 is an enlarged cross sectional side view of an actuator arm/swage plate portion of FIGS. 5 and 6.

FIGS. 5–7 show the swage plate bumper 38 of the present invention utilized in a disc pack 12. Swage plate bumper 38 is attached over the surface of swage plate 30, and extends over the four corners of the swage plate 30. In the preferred embodiment, each swage plate 30 is covered by its own pad 40, 42. The swage plate bumper 38 has a first pad 40 which covers the swage plate 30 on one side of the actuator arm 22, and a second pad 42 which covers the swage plate 30 on the opposite side of the actuator arm 22. The first pad 40 and the second pad 42 are preferably attached to each other and to the actuator arm/swage plate structure by a stem 44 which extends through the swage plate hole 32.

Figure 8:
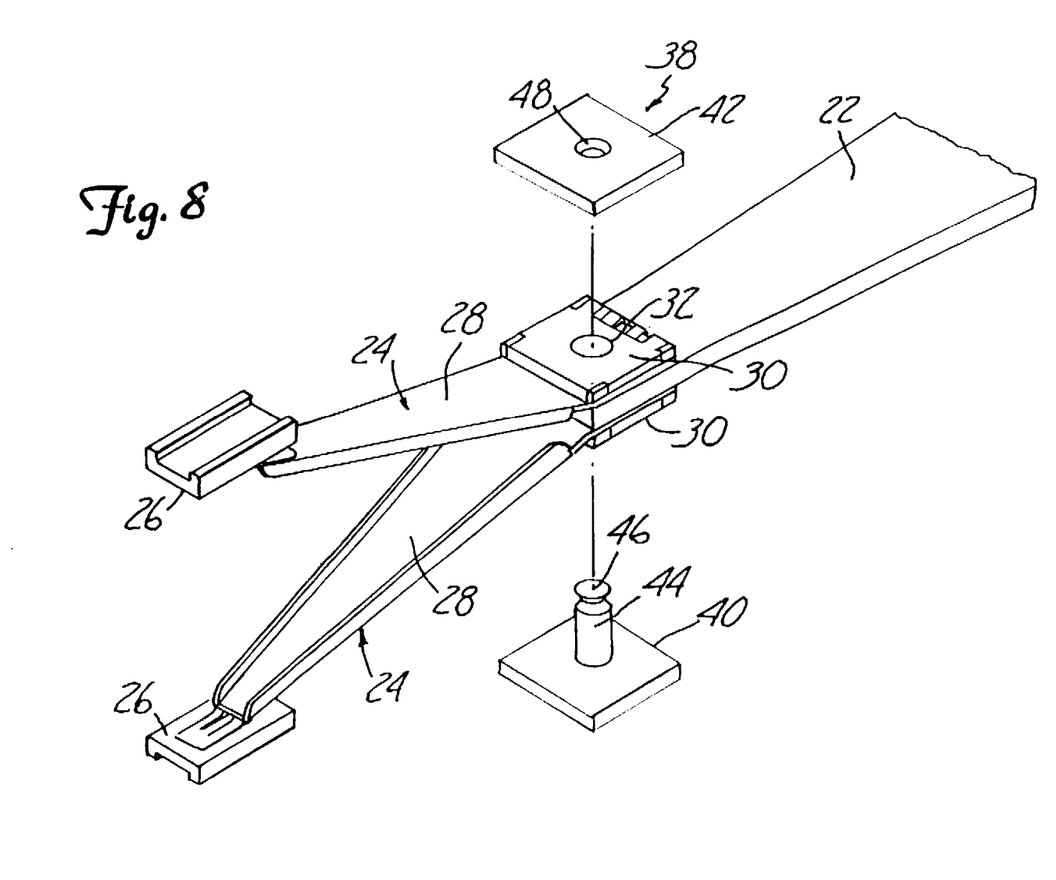
FIG. 8 is an exploded perspective view of an actuator arm/swage plate portion of FIG. 7.
Figure 9:
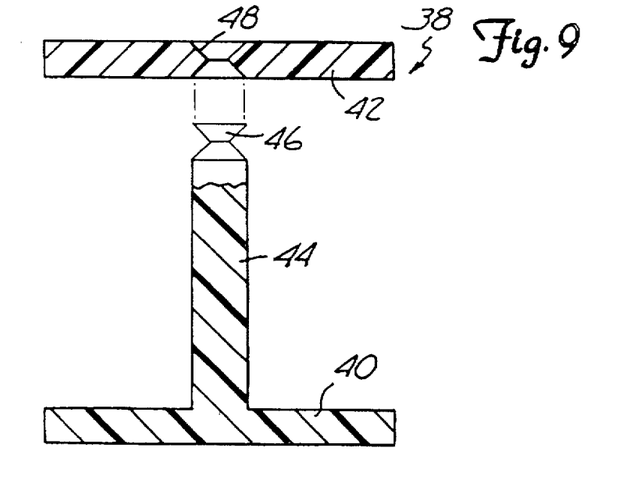
FIG. 9 is an enlarged cross sectional side view of the swage plate bumper of FIGS. 5-8.

FIGS. 8 and 9 show construction and assembly of the swage plate bumper 38 of the present invention over swage plates 30 and actuator arm 22. After the suspension arms 24 are swaged onto actuator arm 22, the stem 44 of pad 40 is fitted into swaged hole 32. With the stem 44 of pad 40 extending into swaged hole 32, pad 40 covers all four corners of swage plate 30. Stem 44 has an notched end 46 which projects out of the other side of swaged hole 32. The second pad 42 has a central hole 48 sized to receive the notched end 46 of stem 44 and snap second pad 42 onto stem 44. The second pad 42 is then snapped onto stem 44, such that second pad 42 covers all corners of swage plate 30. Connecting first pad 40 and second pad 42 together in this manner simultaneously attaches swage plate bumper 38 to swage plates 30 and actuator arm 22 and provides an easily assembled unit.

The best material for the swage plate bumper 38 is an ultra high molecular weight plastic with low out gassing and low particle generation. The material should be softer than the material of disc 16. Discs 16 are commonly made with an aluminum or nickel phosphorus substrate coated with layers of chromium, cobalt based alloy, carbon overcoat and lubricant. The elastic modulus of the plastic material is preferably 20 GPa or less, and the compressive yield strength of the plastic material is preferably 10 kpsi or less. The material is preferably moldable by injection molding or other processes so swage plate bumpers 38 can be easily and cheaply made. Many candidate materials are available for the material of swage plate bumper 38, however, the preferred material is DELRIN polyimide.

Figure 10:
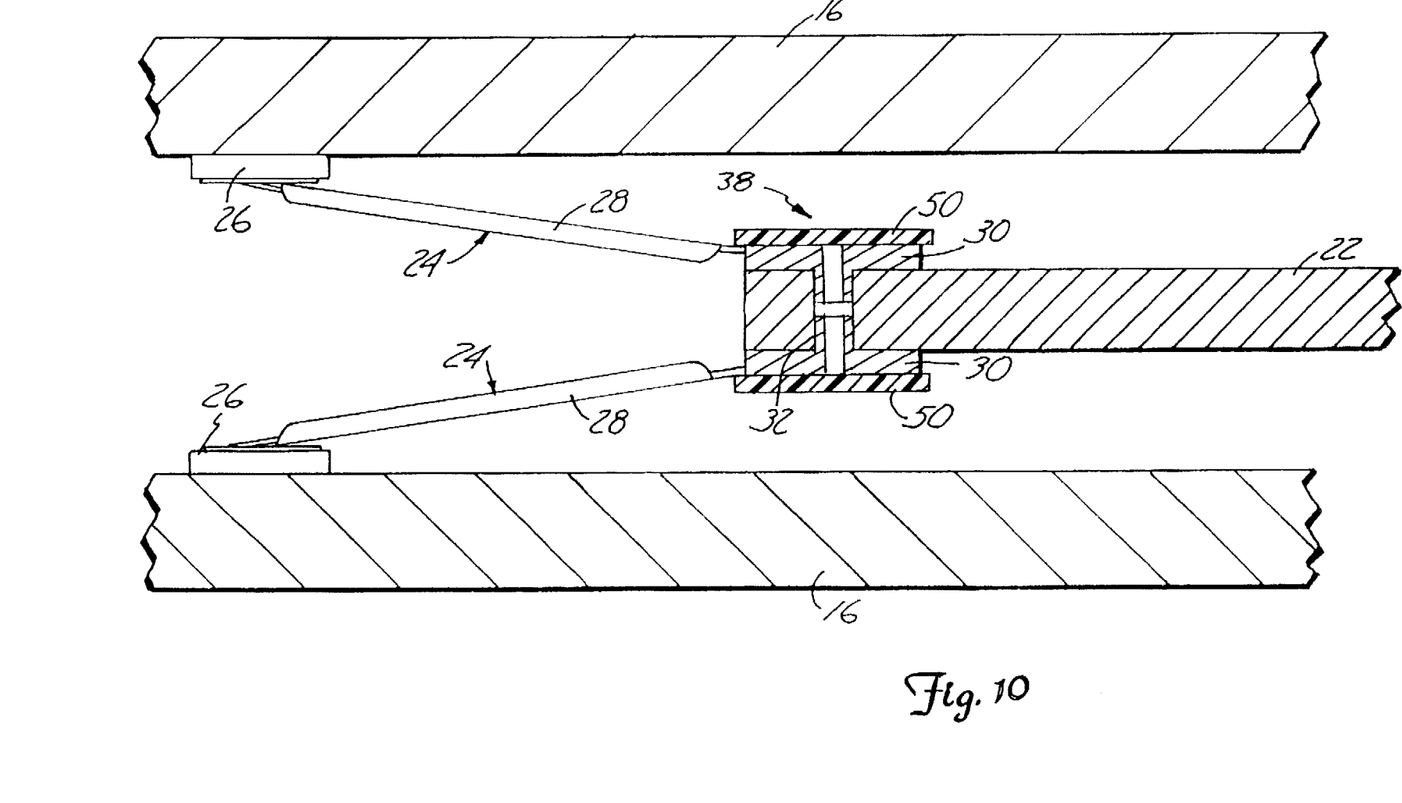
FIG. 10 is an enlarged cross sectional side view of an alternative embodiment of the present invention.

FIG. 10 shows a first alternative embodiment of the present invention. In this alternative embodiment, swage plate bumper 38 is formed of an adhesively attached compressible layer 50. The compressible layer 50 could be provided, for instance, by a thin adhesive tape, and thus no stem attachment through swaged hole 32 is necessary. The compressible layer 50 should be formed of a material with low out-gassing and low particle generation, which again is softer than the material of disc 16.

Figure 11:
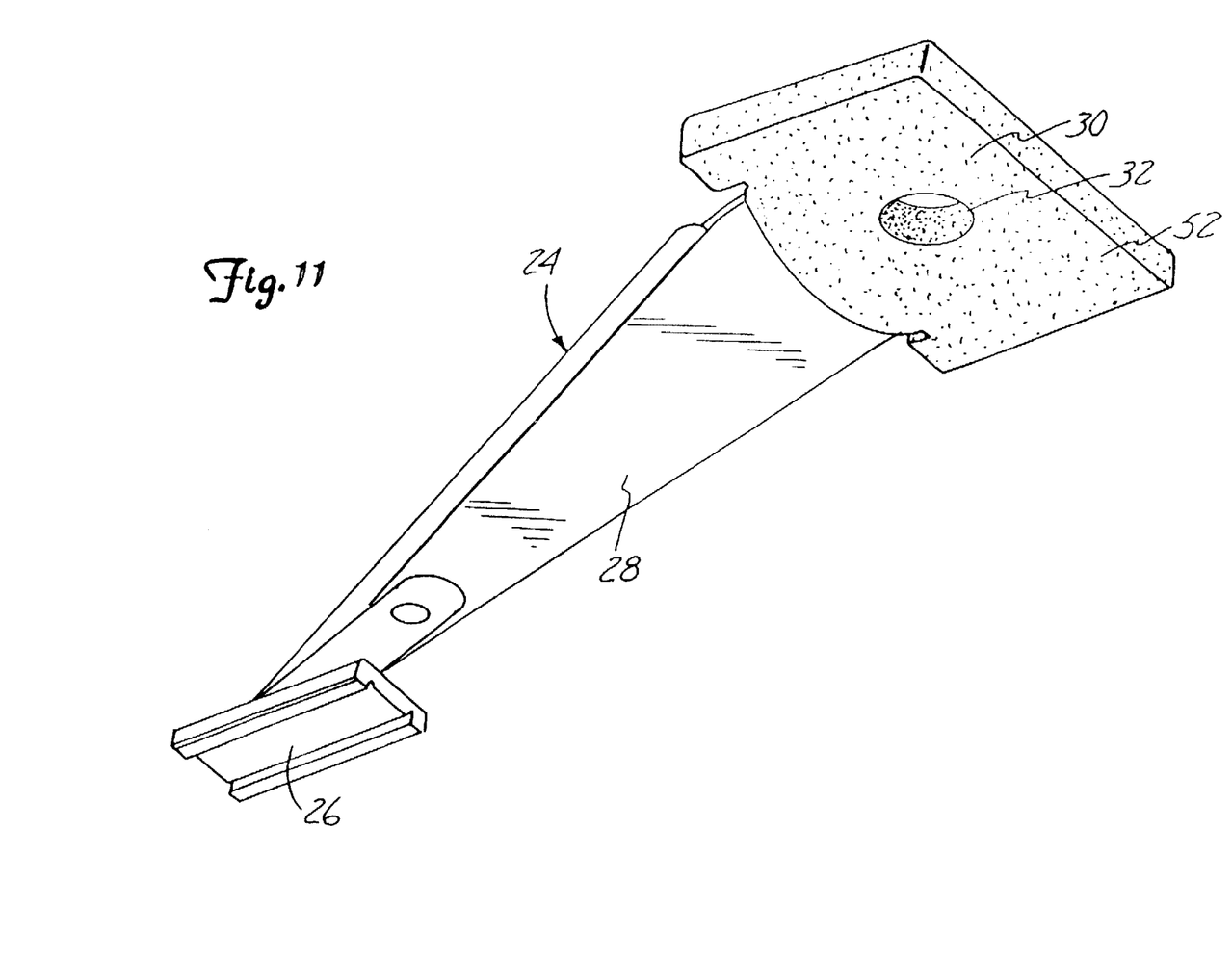
FIG. 11 is a perspective view of a suspension arm having its swage plate coated in accordance with a second alternative embodiment of the present invention.

FIG. 11 shows a second alternative embodiment of the present invention. In this alternative embodiment, swage plate 30 of suspension arm 24 has been coated with a polymeric material 52. The coating 52 may be applied to suspension arms 24 during manufacture of suspension arms 24 and prior to swaging of suspension arms 24 onto actuator arm 22, such as by swage plates 30 of suspension arms 24 into a liquid polymeric solution and then allowing the polymeric solution to solidify or dry over the swage plates 30. Manufacture of the swage plate bumper by coating of swage plates 30 simplifies assembly of the disc drive 10. The elastic modulus of the material for polymeric coating 52 should be less then 20 GPa and the compressive yield strength should be less than 10 kpsi. As with the first two embodiments, the material for polymeric coating 52 should be softer than the material of disc 16.

Although the present invention has been described with reference to preferred embodiments, workers skilled in the art will recognize that changes may be made in form and detail without departing from the spirit and scope of the invention. For instance, the swage plate bumper could be formed of many materials other than those specified herein, and could be attached over the swage plate in ways other than those detailed herein.

What is claimed is:

1. A swage plate bumper for protecting a recording surface of a hard disc in a computer disc drive, the computer disc drive having a suspension assembly with a swage plate attached to an actuator arm via a swaged hole, the swage plate bumper comprising:

a first pad portion for extending over the swage plate;

a stem connector extending from the first pad portion, the stem connector being sized to extend through the swaged hole; and a second pad portion attachable to the stem connector on an opposing side of the actuator arm.

2. The swage plate bumper of claim 1 wherein the second pad portion is attachable to the stem connector with a snap fit.

3. The swage plate bumper of claim 1 wherein the first pad portion and the second pad portion are formed of a polymeric material that does not outgas.

4. The swage plate bumper of claim 3 wherein the polymeric material is a polyimide.

5. The swage plate bumper of claim 1 wherein the first pad portion and the second pad portion have a thickness from 0.001 to 0.003 inches.

6. A computer disc drive comprising:

a base;

at least one hard disc having a recording surface, the hard disc being rotatably mounted with respect to the base and extending outwardly from an axis of rotation;

an actuator arm assembly mounted pivotally with respect to the base, the actuator arm assembly comprising:

at least one actuator arm end extending over the recording surface;

suspension arm having an attachment portion secured to the actuator arm end, the suspension arm having a load beam extending from the attachment portion at an angle toward the hard disc, the suspension arm having a magnetic head mounting portion extending from a distal end of the load beam, the attachment portion being further from the hard disc than the load beam and the magnetic head mounting portion, the attachment portion having a hole defined therein;

a magnetic head assembly supported by the magnetic head attachment portion of the suspension arm, the magnetic head assembly being biased by the load beam toward the recording surface of the hard disc, the magnetic head assembly having an air bearing slider which contacts the hard disc when the hard disc is stopped and flies over the hard disc when the hard disc is rotating, the magnetic head assembly having a transducer mounted on the slider; and a compressible pad attached over the attachment portion, so as to prevent contact between the hard disc and the attachment portion, the compressible pad comprising:

a first pad portion for extending over the attachment portion; —a stem connector extending from the first pad portion through the hole in the attachment portion; and a second pad portion attached to the stem connector on an opposing side of the suspension arm.

7. The computer disc drive of claim 6, wherein the attachment portion is a swage plate which is swaged to the actuator arm end.

8. The computer disc drive of claim 6, wherein the computer disc drive comprises a plurality of hard discs rotatable about the axis, each of the hard discs having two sides with a recording surface on both sides, and wherein the actuator arm assembly comprises:

an E-block with actuator arm ends extending over each of the recording surfaces;

suspension assembly having an attachment portion attached to each of the actuator arm ends to support a transducer over each of the recording surfaces; and a pad portion of a compressible pad attached over each of the attachment portions.

9. The computer disc drive of claim 8 wherein the compressible pad is formed of a material having a modulus of elasticity no greater than 20 GPa.

10. The computer disc drive of claim 6 wherein the second pad portion is attachable to the stem connector with a snap fit.

11. The computer disc drive of claim 6 wherein the first pad portion and the second pad portion are formed of a polymeric material.

12. The computer disc drive of claim 6 wherein the first pad portion and the second pad portion have a thickness from 0.001 to 0.003 inches.

* * * * *

UNITED STATES PATENT AND TRADEMARK OFFICE
CERTIFICATE OF CORRECTION

PATENT NO. : 5,754,371
DATED : MAY 19, 1998
INVENTOR(S) : DALLAS W. MEYER ET AL.

It is certified that error appears in the above-identified patent and that said Letters Patent is hereby corrected as shown below:

Title Page, Col. 1 [60] insert -- Provisional Application No. 60/009,788 Jan. 10, 1996.--

Col. 6, Line 27, before "suspension arm" insert --a--

Col. 6, Line 49, delete - a first pad portion for extending over the attachment portion: —a stem connector extending from the first pad portion through the hole in the attachment portion; and, insert -- a first pad portion for extending over the attachment portion;

a stem connector extending from the first pad portion through the hole in the attachment portion; and--

Signed and Sealed this

Twenty-fourth Day of August, 1999

Attest:

Q. TODD DICKINSON

*Attesting Officer*  *Acting Commissioner of Patents and Trademarks*